United States Patent [19]
Wallace

[11] Patent Number: 5,858,429
[45] Date of Patent: Jan. 12, 1999

[54] METHOD AND APPARATUS FOR PEELING POTATOES AND THE LIKE

[75] Inventor: Joseph E. Wallace, Creston, Iowa

[73] Assignee: Vanmark Corporation, Creston, Iowa

[21] Appl. No.: 854,739

[22] Filed: May 12, 1997

Related U.S. Application Data

[60] Provisional application No. 60/036,593 Mar. 14, 1997.
[51] Int. Cl.⁶ .............................. A23N 7/00; B23Q 15/00; G01N 33/00
[52] U.S. Cl. .............................. 426/231; 99/486; 99/491; 99/630; 382/110; 426/482
[58] Field of Search ..................................... 426/231, 482, 426/483; 99/630, 486, 489, 491, 585, 629; 382/110

[56] References Cited

U.S. PATENT DOCUMENTS

| | | | |
|---|---|---|---|
| 3,745,914 | 7/1973 | Wallace | 99/630 |
| 4,132,162 | 1/1979 | Magnuson | 99/630 |
| 4,710,389 | 12/1987 | Dornow | 426/231 |
| 5,550,927 | 8/1996 | Zittel et al. | 382/110 |

OTHER PUBLICATIONS

"New CVIM2 Machine Vision: Easy, Flexible and Fast"—Bulletin 5370 CVIM2 Configuration Vision Input Module—Brochure—Copyright 1992 Allen–Bradley Company, Inc.

Bulletin 5370 Color CVIM Configurable Vision Input Module—(Catalog No. 5370–CVIMC) Product Data —Copyright 1994 Allen–Bradley Company.

*Primary Examiner*—George Yeung
*Attorney, Agent, or Firm*—Zarley, McKee, Thomte, Voorhees & Sease

[57] ABSTRACT

A method of controlling the removal of peelings from a potato product in a peeling machine having abrasive rollers, a rotatable discharge gate, and a discharge conveyor includes providing a shadow-free lighting structure over the conveyor, taking photographs of product on the conveyor flowing under said lighting structure, determining the number of dark pixels in each photograph and passing that number to a processor, placing a defined value for the preferred number of dark pixels in the processor, comparing the determined number of dark pixels with the predetermined value of dark pixels, and adjusting the operation of the machine to increase or decrease the amount of peelings being removed to bring the number of dark pixels subsequently determined closely to the predetermined value of dark pixels. A product peeling machine has a high speed camera over the conveyor. A high speed camera is mounted over the conveyor to take photographs of groups of product moving with the conveyor. A computer control is connected to the camera for measuring the number of dark pixels in the photographs and comparing them with a predetermined number of desired dark pixels.

13 Claims, 8 Drawing Sheets

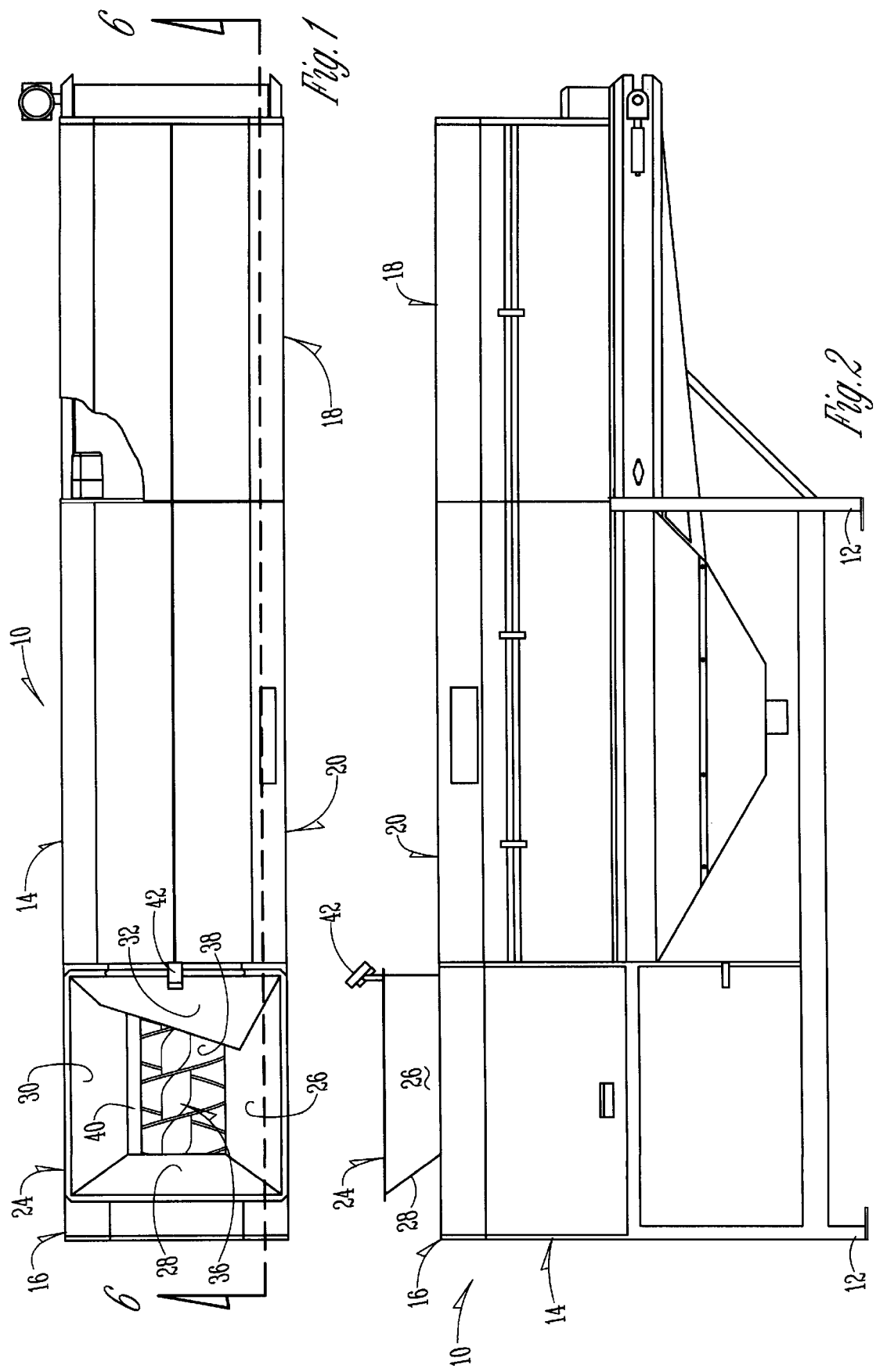

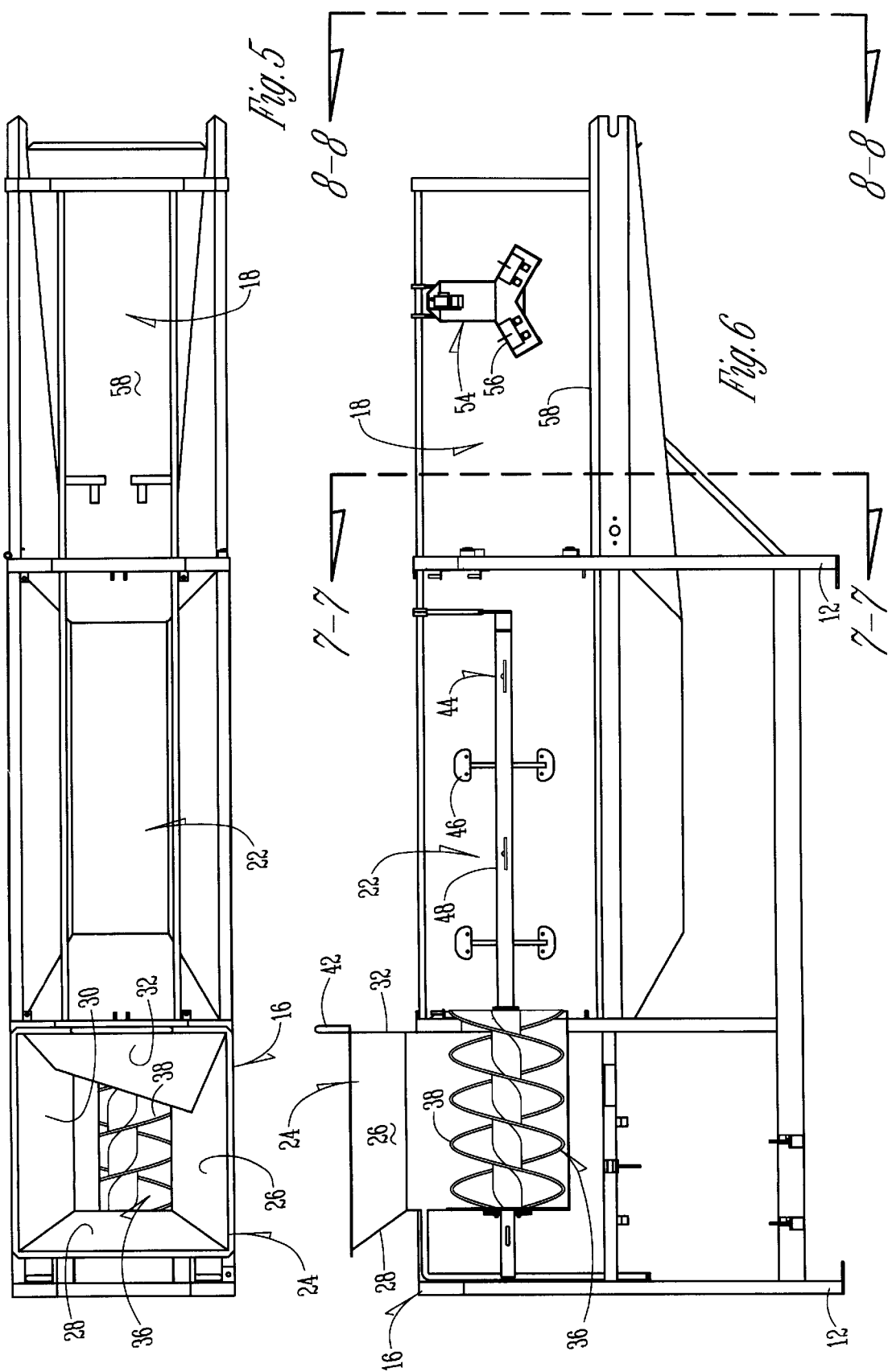

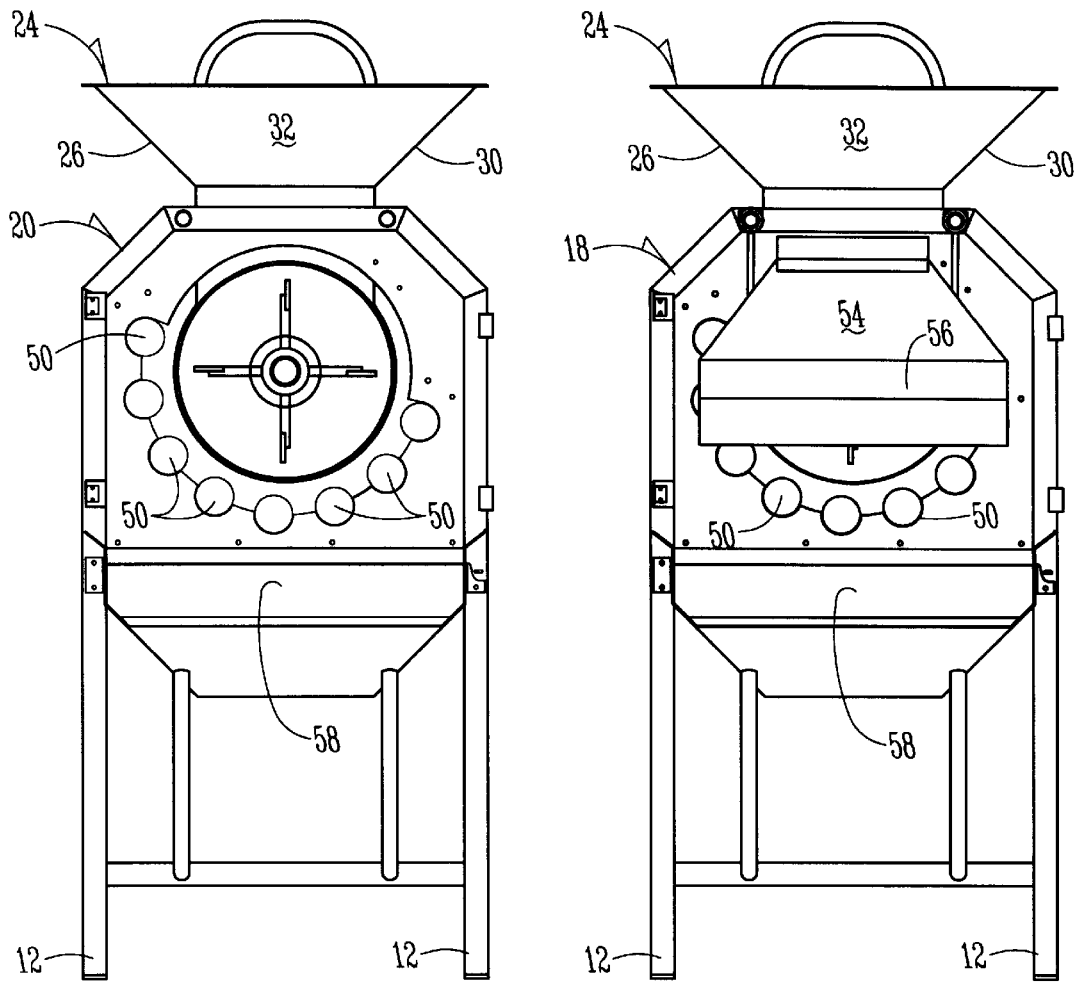
Fig. 7
Fig. 8
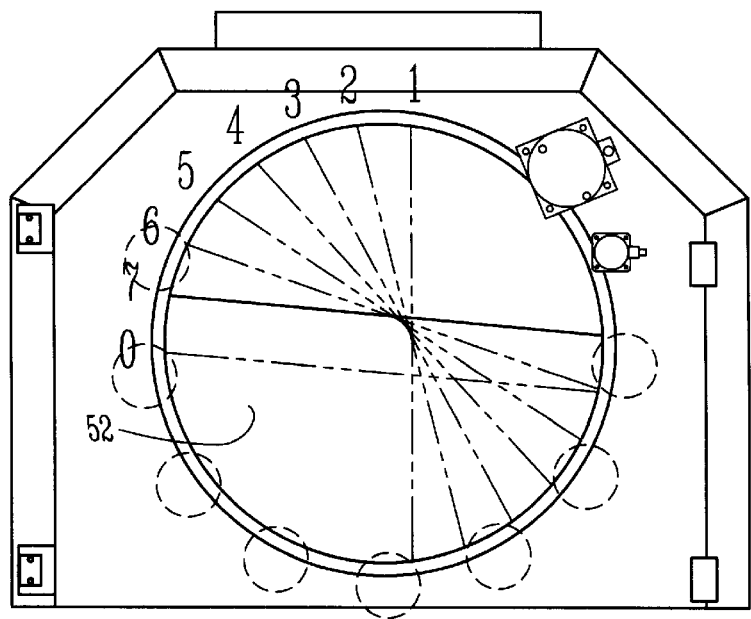
Fig. 9

5,858,429

METHOD AND APPARATUS FOR PEELING POTATOES AND THE LIKE

CROSS-REFERENCE TO RELATED APPLICATIONS

This application claims the benefit of the U.S. Provisional application Ser. No. 60/036,593 filed Mar. 14, 1997 under the same title.

BACKGROUND OF THE INVENTION

The present invention relates to the field of peeling methods and devices for peeling vegetables, fruits, and the like.

Vegetable (e.g. "potato") peeling devices are old in the art. See U.S. Pat. No. 3,745,914, which is incorporated herein in its entirety. The drawings of U.S. Pat. No 3,745,914 are incorporated by reference. Such devices comprise a hopper which has an auger or the like deliver potatoes or the like to an abrading chamber which includes a plurality of elongated closely aligned rotatable abrasion rolls. Material to be peeled is fed into the chamber. A tumbling action takes place as the materials move longitudinally along the rotating rolls to an exit opening which is controlled by a moveable gate. The degree of peeling is controlled by the speed of rotation of the rolls, the volume of material in the chamber, etc. However, control of the peeling process could be more accurate.

Experience has shown that all adjustments within a continuous peeler are relative to the product infeed rate. This infeed rate if variable will render a variable peel result and therefore render ineffective the individual controls within the peeler itself.

Therefore, a principal object of the invention is the provision of a machine and method for controlling the degree of peel of the potato or the like through photo analysis, and the controlling of the machine to alter its operation to adjust the degree of peel to a predetermined standard.

A further object of this invention is the provision of a special discharge gate for the peeling chamber to carefully control the volume of material in the chamber and the rate of discharge of the material.

These and other objects will be apparent from the drawings and description which follow.

SUMMARY OF THE INVENTION

The present invention relates to a method and means for peeling or washing vegetables, fruits, and the like. The means or device of this invention includes an infeed auger, peeling chamber with a peeler operatively disposed therein, product tumbler, discharge gate, camera and vision analysis system (VAS). The camera and VAS provide consistent evaluation of the degree of peeling of the product just upstream of the dam-like discharge gate. Based upon this evaluation, the height of the discharge gate (the load level within the peeling chamber) and/or the speed of the peeler rollers is adjusted to achieve the desired peeling or washing effect.

The auger, tumbler, roll speed, gate position and VAS with controls, provide a method to consistently and continuously feed, monitor product level, peel or wash product, analyze the results and make adjustments within the peeling chamber to create the desired end product results.

This invention ensures continuous and consistent product flow rate, eliminating the need to start and stop equipment resulting in considerable power savings, as well as reduced equipment wear. A predictable end result is accomplished with considerable raw product savings, eliminating over peeling or irregular peeling as is now the case. Finished product quality could be predicted and assured. Management would have the capability to pre-set and guarantee their requirements and repetitively establish those values rather than depending upon individual operator opinion.

BRIEF DESCRIPTION OF THE DRAWINGS

FIG. 1 is a top plan view of a peeling machine equipped with the present invention.

FIG. 2 is a side elevation view of the peeling machine of FIG. 1.

FIG. 5 is a top plan view similar to FIG. 1 except the top of the machine has been removed to expose the components inside.

FIG. 6 is a longitudinal sectional view taken along line 6—6 in FIG. 1.

FIG. 7 is a transverse sectional view taken along line 7—7 in FIG. 6.

FIG. 8 is a transverse sectional view taken along line 8—8 in FIG. 6.

FIG. 9 is an enlarged scale end view showing the discharge gate.

DETAILED DESCRIPTION OF THE PREFERRED EMBODIMENT

Figure 2A:
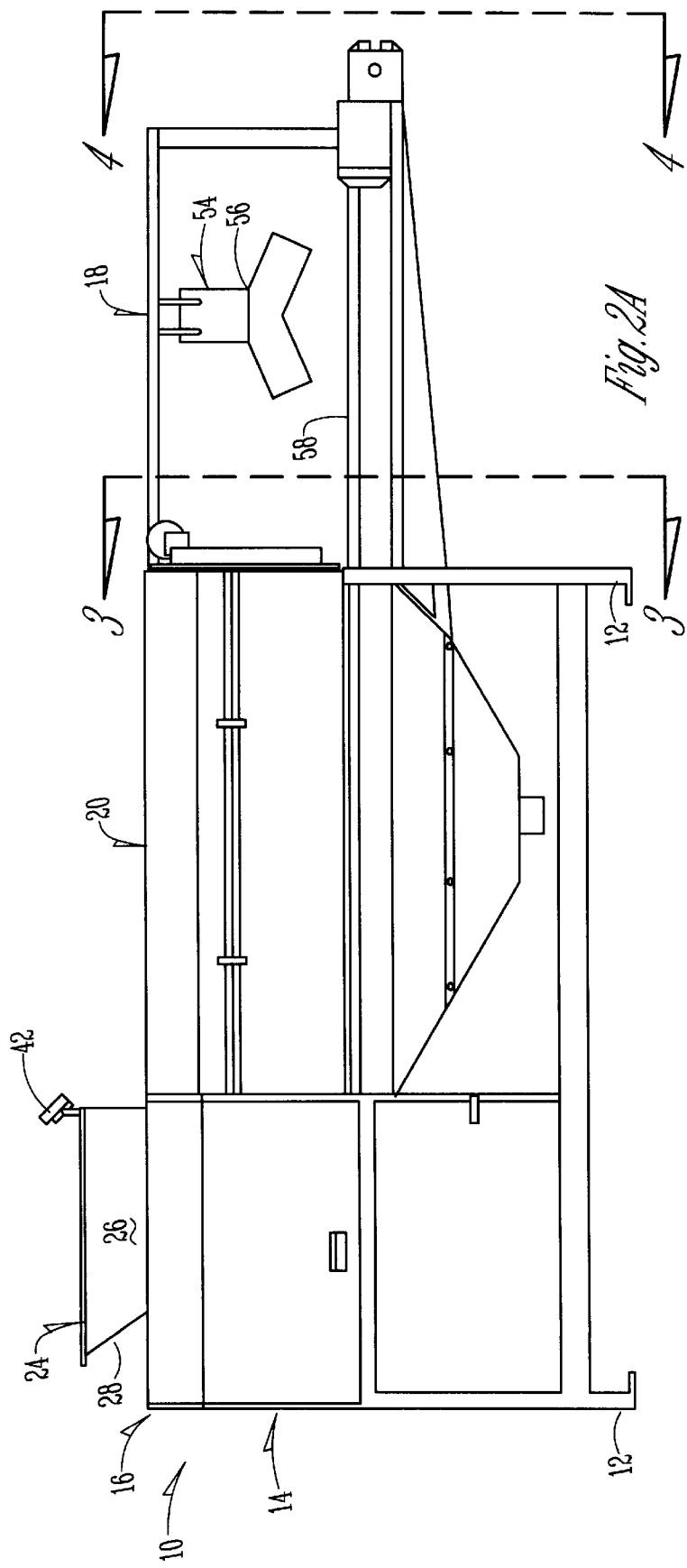
FIG. 2A is a side elevation view similar to FIG. 2 except the cover at the discharge end of the machine has been removed to expose the conveyor and camera mounted thereover.
Figure 4:
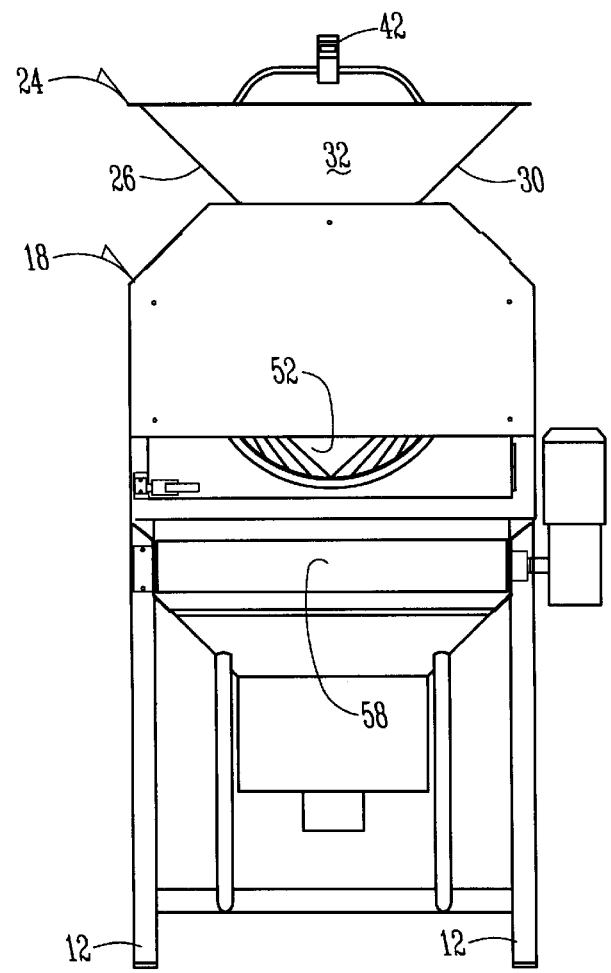
FIG. 4 is an elevation view taken along line 4—4 at the right-hand end of FIG. 2A.

The peeling machine, device or means of the present invention is generally denoted by the reference numeral 10 in the drawings and this description. Referring to FIGS. 1–4 and 7–8, the peeling machine 10 has a plurality of supporting elements or legs 12 supporting an elongated body 14. The body 14 includes an infeed section 16, an output section 18 and a peeling section 20 between the infeed and output sections 16,18. The peeling section 20 comprises a peeling compartment or chamber 22 substantially enclosed by a plurality of walls (FIG. 7).

The infeed section has a hopper 24 with a top opening for depositing the product to be peeled. The hopper walls 26,28,30,32 are slanted inwardly and their lower edges define a bottom opening or mouth 34 disposed above an infeed auger 36. The infeed auger 36, hereinafter referred to as auger, has one or more helical auger flight(s) 38 which provide a continuous and consistent product infeed rate to the peeling chamber. The auger 36 and hopper 24 eliminate pinch points and product damage by wrapping the hopper wall 32 around the auger 36 to the ten o'clock position looking in the direction of product flow. This ten o'clock position allows product to seek a path either one side or the other of the auger flight 38. The product is not drawn into a pinch point, which would happen if the hopper wall 32 was tangentially vertical to the outer circumference of the auger. The auger rotation is counter-clockwise and creates a down movement at the point of tangency. A lip 40 is formed at an obtuse angle at the bottom portion of wall 30. Thus, the bottom opening 34 of the hopper 24 is non-parallel to the edge of the flight 38. The combination of the hopper surfaces 28–32,40, hopper opening 34 and auger flight(s) 38, allow product to be run with no damage. The rotational speed of the auger 36 and its cubic displacement govern the product feed rate to the peeling chamber 22.

A limit switch 42 controls two levels within this hopper 24: 1) the top of the flights, and 2) the top of the hopper 24. Loading product to the first level (to the top of the flights) ensures the auger 36 is completely filled therefore the displacement of this auger 36 will feed product into the peeling chamber 22 at an exact, continuous, and consistent rate. When the auger 36 is running the limit switch 42 will stop the peeler 10 if the product level falls below the top of the flights 38. This ensures a consistent product infeed rate to the peeling chamber 22. Secondly, this limit switch 42 also controls the upper level of the hopper 24 (capacity) and signals incoming product transporting devices to shut off when this limit is reached. The speed control of this hopper 24 is meant to be at the disposal of the operator who must adjust the throughput rate of the peeler 10 to match other equipment to provide a continuous flow through the entire line.

Moving into the peeling chamber 22 and referring to FIG. 6, a product tumbler 44, hereinafter referred to as tumbler, is rotatably mounted therein and driven in conventional manner. The tumbler 44 has flexible paddles 46 mounted on a generally horizontal shaft 48 in the center of the peeling chamber 22. The tumbler 44 extends substantially parallel to the longitudinal axis of the elongated peeling rolls 50 (FIGS. 7 and 8). This assures that regardless of the friction between peeling surface and product that the product will tumble by the action of this tumbler. The tumbler 44 rotates in the same direction as the product would naturally move in the peeling chamber 22.

The peeling rolls 50 comprise a series of shafts upon which are installed rolls having various types of surfaces; such as abrasive, brush, pintle, lift, etc. Rolls 50 touch the product and peel, wash or otherwise have contact with or act upon the product. The rotational speed of the rolls 50 is adjustable and clockwise in the direction of the product flow. On exceptions, multiple or individual rolls 50 may rotate in an opposite direction to adjacent rolls 50 to intentionally create a pulling motion to eliminate debris from the peeling chamber 22, i.e. for cleaning purposes. As product moves longitudinally along these rolls 50 a continuous effect between peeling rolls and product provides the required end result of peeled or washed product.

Adjustment to the speed of the peeling roll 50 is one means of creating a desired effect; a second means is adjusting the load or amount of product within the peeling chamber 22. The time product takes to travel the length of the rolls 50 is the time allowed to peel or wash to accomplish the desired end result, however this time is a factor of the total line capacity and therefore retention time is not a part of this invention theory. With this in mind, adjustments such as roll speed and load level within the peeling chamber are the controls used to create the desired peeling or washing effect.

As the peeling rolls 50 rotate they create tumbling action within the machine 10. This natural tumbling of the product, or when assisted by a tumbler 44, creates action of the product within the peeling chamber 22. This action allows all of the outer surface of the product to come in contact with the peeling or washing surface of the rolls 50. This area of contact is measured by the diameter times the length of the peeling roll 50 and gives square feet of surface area for the product to contact. Increasing the rotational speed of the rolls 50 increases the available area for the product to contact the peeling or washing surface. Inversely with the decrease of the rotational speed of the rolls 50 the surface area is decreased. This is known as the amount of peeling or washing area.

Figure 3:
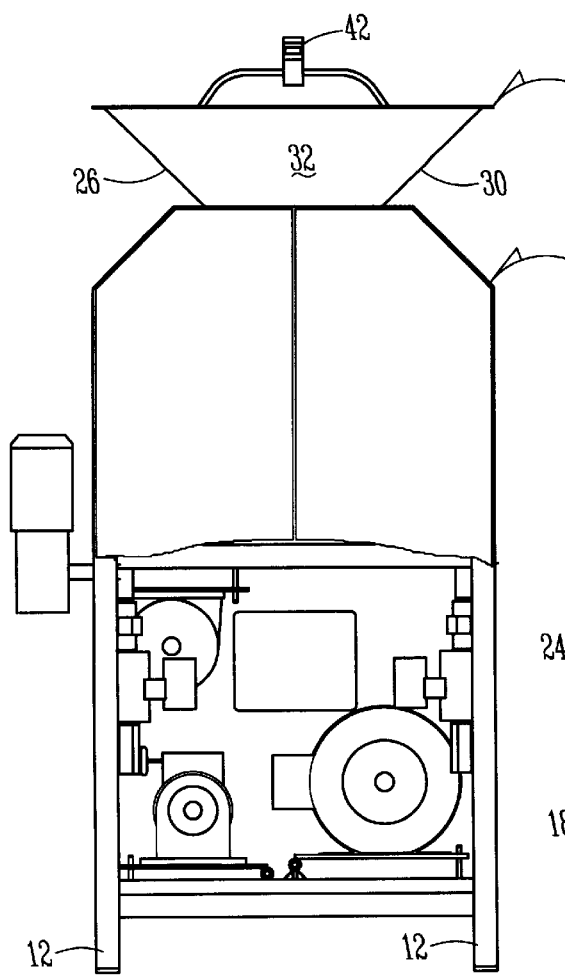
FIG. 3 is an elevation view taken along line 3—3 in FIG. 2A.
Figure 3A:
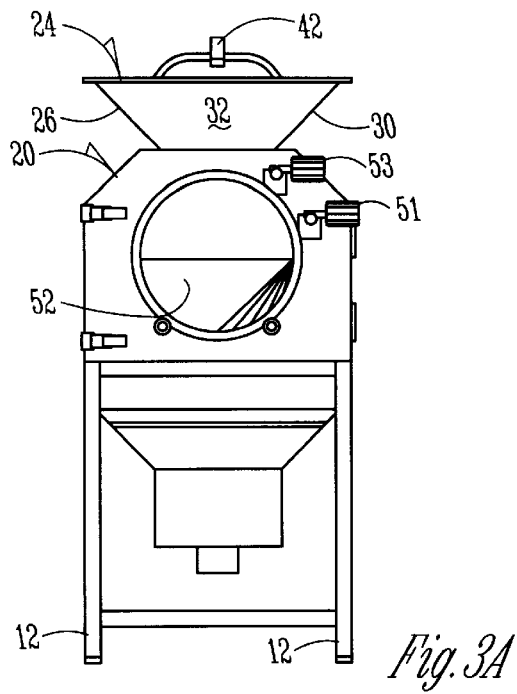
FIG. 3A is an end elevation view showing the discharge gate.
Figure 4A:
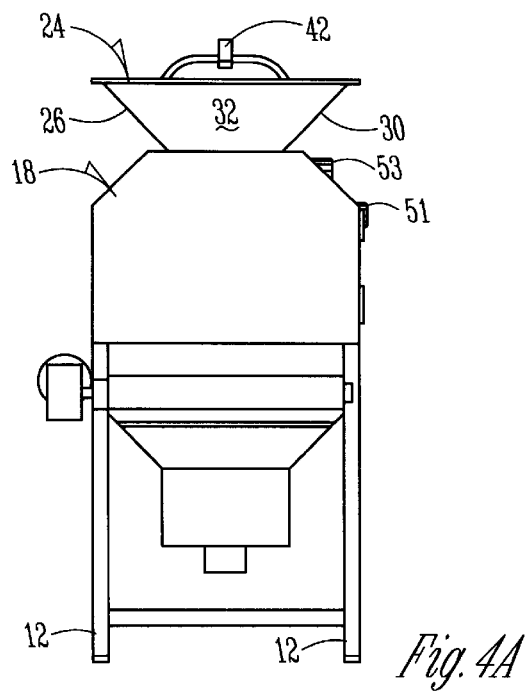
FIG. 4A is an end elevation view of the end opposite the discharge gate.
Figure 5A:
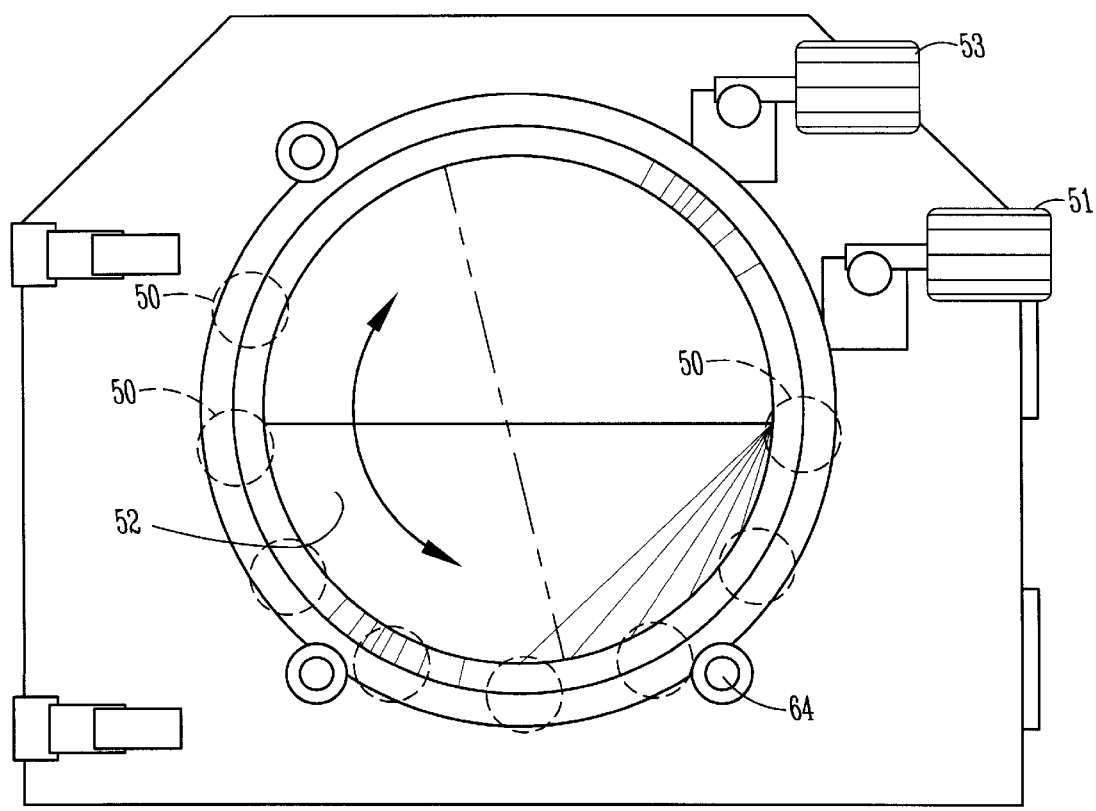
FIG. 5A is an enlarged scale view of the discharge gate of FIG. 3A.
Figure 6A:
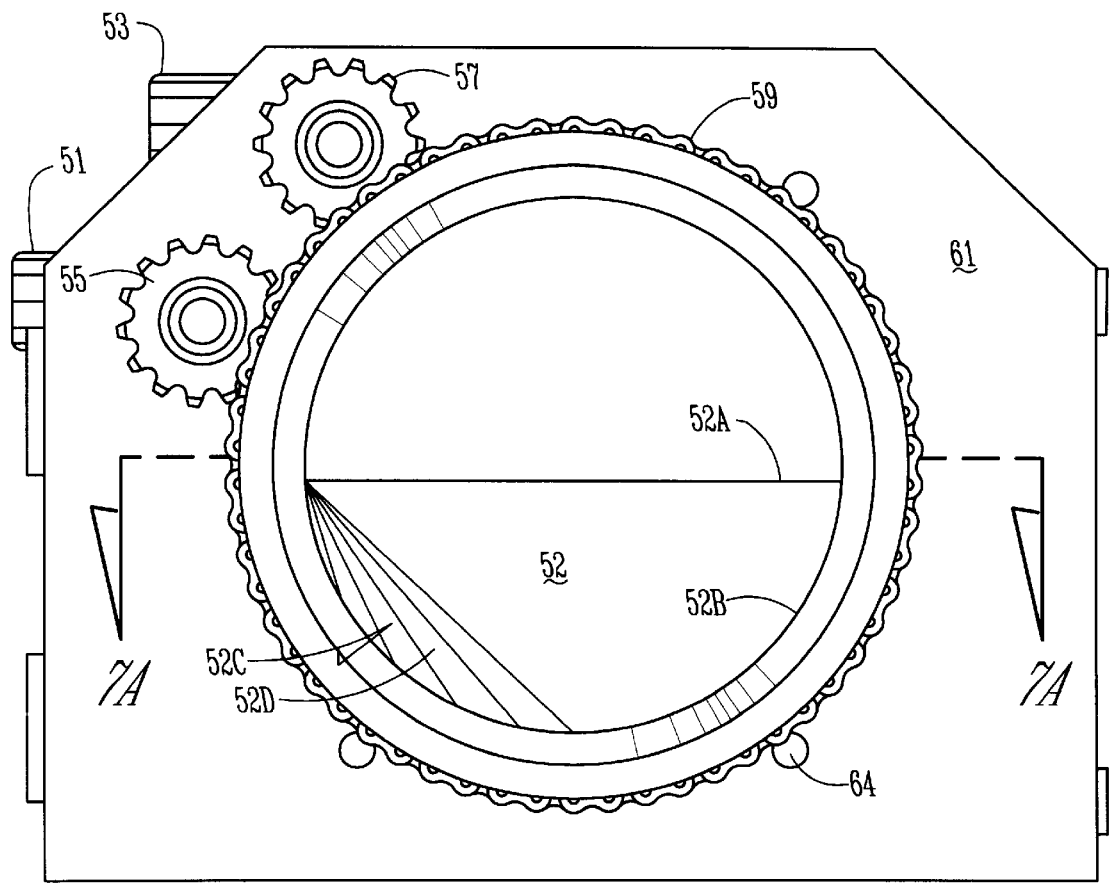
FIG. 6A is a sectional view showing the reverse or inner side of the discharge gate of FIG. 5A.
Figure 7A:
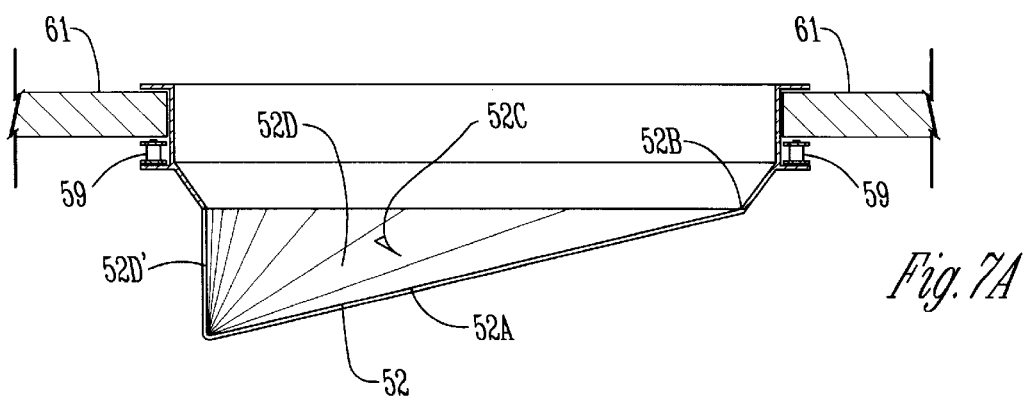
FIG. 7A is a cross-sectional view taken along line 7A—7A in FIG. 6A.

Moving to the output section 18 of the peeler 10 and referring to FIGS. 9, 3A, and 5A the discharge gate 52, hereinafter referred to as gate, is an adjustable load level control device. It creates an adjustable restriction of the product level within the peeling chamber 22; i.e., the higher the dam and deeper the water. As best seen in FIGS. 9, 6A and 7A, a pair of motors 51, 53 respectively drive sprockets 55, 57 which engage a chain 59 fixed to the periphery of the discharge gate 52. The gate 52 is journaled in a surrounding frame 61 and guided by guide rollers 64 so as to rotate and thereby be adjustable between open and closed positions when driven by the sprockets 55, 57.

The gate 52 is semi-circular in shape and has an upper edge portion 52A, a semi-circular perimeter edge portion 52B, a tapered inwardly extended indented portion 52C. Portion 52D has an upper edge 52D' which is axially dispersed and intercepts edge portion 52A at substantially right angles. The gate 52 is adopted to be rotated through the numbered increments (0–7) shown in FIG. 9. It should be noted that when rotated to one of these eight positions (0–7) shown in FIG. 9, edge 52D' of the gate will always be positioned tangentiably below one of the peeling rolls 50 (e.g. see dotted lines in FIG. 5A) which serves to prevent any potato or the like from becoming lodged between the roll 50 and the edge 52D' as compared to the situation edge 52D' was slightly spaced from the roll. Thus, potatoes will flow from the roll 50 directly over the edge 52D' and into the indented portion 52D to facilitate flow of the peeled product from the interior of the machine.

Product load within the peeling chamber 22 is varied by the position of the discharge gate 52. As the gate 52 is closed it creates a deeper load of product in the peeling chamber 22 creating more pressure between the product and the peeling surface by building product on top of product. As the gate 52 is opened it allows product to flow from the machine creating a lesser depth of load in the peeling chamber 22 thus creating less pressure between product and peeling surface. This is known as the effect of the peeling or washing surface.

Therefore, with a consistent and continuous infeed rate and a given capacity of product throughput, the two adjustments needed for the desired end product result are effect and amount of the peeling or washing surface. The gate position determines the effect and rotational speed of the rolls 50 determines the amount. These two adjustments will interact with each other at any volume of throughput within the machine's range of volume and speed. The primary control is the position of the gate 52 (effect); the secondary control is the roll speed (amount). With consistent and continuous input capacities dictated by the control of the auger 36, and balanced controls between gate position and roll speed, end product results can be predicted. It is this predictability and consistent end product results that make the vision analysis and control system possible.

The vision analysis system, hereinafter called the VAS, is a camera device[1] 54 with sufficient shadow-free light to observe the product exiting the gate 52 from the peeling chamber 22 and recognize a degree of peel or wash which is given a numerical value. For example, this numerical value will change as the color of the potato changes from brown to white when removing skin. The numerical value given to the average of multiple images over a set period of time will be sent to the VAS. This average value is compared by a PLC, program logic control, to a pre-set value which would indicate if an adjustment is needed. A given length of time is required to allow sufficient time for the product in the peeling chamber 22 to be affected by any change in the controls within the peeler 10. This average of multiple images when entering the VAS will be compared with the pre-set value and if this average value is less than the pre-set value a decision will be made that the gate 52 is closed too far, accounting for too deep a load for that roll speed and feed rate. It would then command the gate 52 to be opened one adjustment.

[1] e.g. CVIM (Gray or Color Imaging Vision Machine, Allen-Bradley brand, Milwaukee, Wis.)

The camera 54 would continue to average images over the next given length of time to ensure that the new set of images would be representative of the new gate position (effect). This average value would again be sent to the VAS for comparison and decision. This action would be repetitive until the maximum opening 0 of the gate 52 (effect) is accomplished and if still not equal to the pre-set value, a decision would be made by the VAS to decrease the roll speed a given percentage, thus the amount available to the product would be reduced. The gate 52 would return to its first central position 4 and an analysis of product would continue with images compared to the pre-set value to determine if this sequence of adjustments created the desired end result. The reverse of this sequence would occur if the average value is greater than the pre-set value. Adjustments to this gate 52 will be positive or negative from the base home position by predetermined degrees. The positive and negative adjustments to the gate 52 determines the product load within the peeling chamber 22 and renders the effect of the peeling surface. The positive and negative adjustments to the roll speed renders the amount of peeling surface.

Three things primarily affect the peel quality of conventional peelers. Other factors can change the overall quality, such as tumbling units or grit size on rollers. However, to control the peeler 10 of this invention, the only concern is altering the amount and effect to compensate for a given infeed rate for the auger 36. These three things are as follows:

1. Time of product inside peel chamber 22. This is controlled by the auger speed. The auger speed is controlled by an individual user and is not controlled by the automation process.
2. (Amount) The amount of surface area to come in to contact with the product during the time inside the peel chamber 22. This is controlled by the roll speed. The faster the roll speed, the more surface area to come in to contact with the product per time frame. The amount is controlled by the automated sequence.
3. (Effect) Pressure between the product and the abrasive rolls 50. This is controlled by the position of the discharge gate 52 position. The higher the level of product, the heavier the load inside the chamber 22 and thus the greater the pressure pushing against the product in contact with the roll surface. The effect is also controlled by the automated sequence.

Rules can be established for the automated sequence. The following rules have been set in the preferred embodiment of this invention.

1. The high end limits and low end limits need to be set so the machine does not run in an unsuitable or dangerous fashion during automatic mode.
   a) Auger Speed: 6,000–40,000 lbs/hr
   b) Rolls Speed: 150–550 RPM
   c) Gate Positions: 0,7 (0=Fully Open, 7=Fully Closed)
      i) During automated peel control, gate position 0 is not being used. This position is used to empty the peel bed only.
2. Since changing the amount of surface area passed over the product has such an adverse peel quality change, we need to alter the effect by raising and lowering the gate 52 as required first. Then, when all attempts to adjust peel quality with the gate positions have failed, then we need to adjust the amount with the roll speed.
3. When a roll speed change occurs, the gate 52 must also return to (Mid-Gate) gate position 4 in order to start the fine adjustment procedures over again.

In order to effectively control the discharge gate 52 and the roll speed, a camera 54, a VAS, and a PLC are utilized in the following manner.

Figure 10:
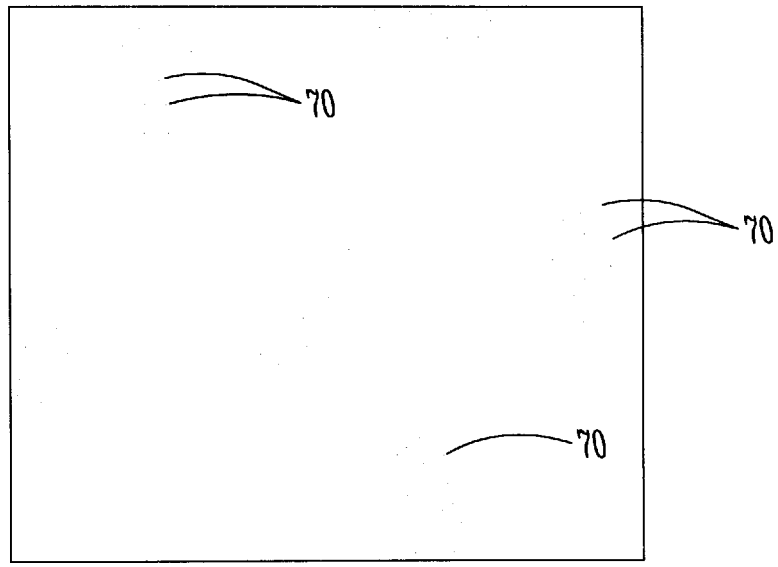
FIG. 10 is a possible image which can be sent to the Vision Analysis System by the camera shown in FIG. 6. The image has a relatively low Pixel value of 500, indicating that the product has been peeled to a high degree.
Figure 11:
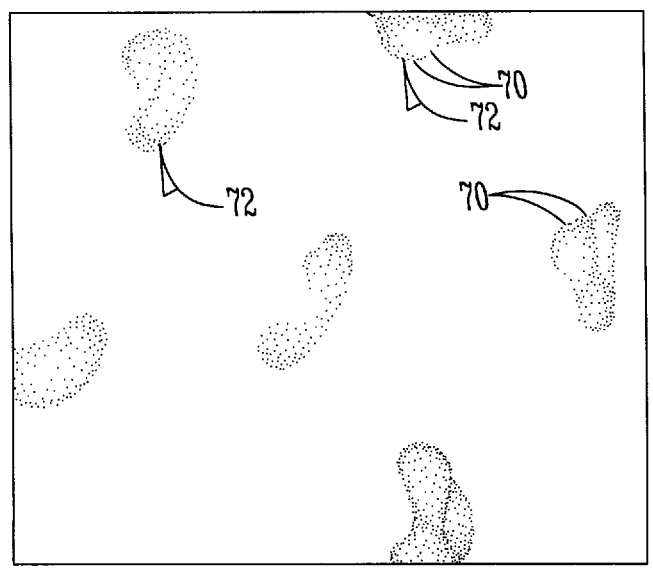
FIG. 11 is another possible image which can be sent to the Vision Analysis System by the camera shown in FIG. 6. The image has a relatively high Pixel value of 20,000, indicating that the product has been peeled to a low degree.

1. As best seen in FIG. 6, a digital black and white camera 54 is set up anywhere down line of peeling section 20 and above its discharge. This camera 54 should be looking at a shadow-free environment, provided by a lighting structure 56 over a belt 58 colored to match the color of completely peeled product. Using a shadow free lighting structure 56 eliminates the need for under belt lighting.
2. The Vision Analysis System mentioned above ("VAS") will interpret the digital signal from the camera in the following method.
   a) Two times per second, the camera 54 takes a snap shot of a group of product flowing under the lighting structure 56 on the belt 58. The snap shot covers an area of approximately 8.5 inches by 8.5 inches. The image or corresponding digital signal is sent to the VAS.
   b) The VAS then analyses the number of dark pixels seen in each image. FIGS. 10 and 11 illustrate examples of typical images that might be received by the VAS. FIG. 10 illustrates an image showing a relatively few small pieces of peel 70 remaining on the product. This would return a relatively low number of Pixels, for example approximately 500 Pixels. On the other hand, FIG. 11 shows an image showing several large pieces of peel 72 remaining on the product. This corresponds to a relatively high number of pixels, for example 20,000 Pixels.
   c) The VAS then passes this information on to a Program Logic Control (PLC) processor which in turn stores 100 of these calculated pixel counts for further calculations.

3. After the PLC receives 100 calculated pixel counts, it averages them together to comprise an over all determination and makes on of the following decisions:
   a) If the images are too light (the average number of pixels is less than a user defined value) and therefore too much peel has been removed, then the PLC decides to adjust the peeler to remove less peel from the product.
   b) If the images are too dark (the average number of pixels is greater than a different user defined value) and therefore not enough peel has been removed, then the PLC decides to adjust the peeler to remove more peel from the product.
   c) If the images are within the tolerable limits, then no action is to be taken.
4. If the PLC were to determine that the image was too light, the following sequence would continue every 2 minutes 50 seconds until the image becomes either within the tolerable limits or the image becomes too dark or if the roll speed ever drops below 150 RPM.
   a) If the gate 52 is not on position 1, then the gate 52 opens one position.
   b) If the gate 52 is on position 1, then the roll speed is reduced 50 RPM and the gate position is returned to the Mid-Gate position 4.
   c) If the roll speed drops below 150 RPM, then the machine 10 is shut off and the rolls 50 must be changed to a less aggressive abrasive because too much peel was being removed with too little effort.
   d) After any gate change, the PLC then waits for 2 minutes before accepting any values from the VAS. This allows the bed level, input and output rates to stabilize.
   e) Then, after waiting for the bed stabilization, return to step 2 to start the 100 snap shot sequence over. This will take another 50 seconds.
5. If, however, the PLC were to determine that the image was too dark, the following sequence would continue every 2 minutes 50 seconds until the image becomes either within the tolerable limits or the image becomes too light of if the roll speed ever raises over 550 RPM.
   a) If the gate 52 is not on position 7, then the gate 52 closes one position.
   b) If the gate 52 is on position 7, then the roll speed is increased 50 RPM and the gate position is returned to the Mid-Gate position 4.
   c) If the roll speed raises over 550 RPM, then the machine 10 is shut off and the rolls 50 must be changed to a more aggressive abrasive because not enough peel was being removed with too much effort.
   d) After any gate change, the PLC then waits for 2 minutes before accepting any values from the VAS. This allows the bed level, input and output rates to stabilize.
   e) Then, after waiting for the bed stabilization, return to step 2 to start the 100 snap shot sequence over. This will take another 50 seconds.

Therefore to summarize the auger 36, tumbler 44, roll speed, gate position and VAS with controls, create a method to consistently and continuously feed, monitor product level, peel or wash product, analyze the results and make adjustments within the peeling chamber 22 to create the desired end product results. The control logic, timing and predetermined values can be adapted for the product being peeled and the particular machine to achieve the desired results.

Modifications to this machine 10 would allow the use of a single camera 54 which would send a signal to a VAS monitoring multiple machines. This camera 54 would intermittently analyze the result from each individual machine 10 so that decisions of control could be made accordingly. Modifications would also allow the use of individual camera 54 for each machine 10 and send signals to a single VAS to control individual machines 10.

Therefore it can be seen that the present invention at least accomplishes its stated objects.

What is claimed is:

1. A method of controlling the removal of peelings from a potato product being passed into a hopper having a supply auger for discharge of the product into a peeling chamber having a plurality of parallel longitudinal abrasive rollers arranged in an arcuate juxtapositioned relation, with a rotatable discharge gate movable between open and closed positions, a movable conveyor downstream of said gate, and power means to operate said auger, said rollers, said gate, and said conveyor, comprising:

providing a shadow-free lighting structure over said conveyor, taking photographs of groups of product on said conveyor flowing under said lighting structure, determining the number of dark pixels in each photograph and passing said number to a processor, placing a predetermined value for a preferred number of dark pixels in said processor, comparing the determined number of dark pixels with said predetermined value of dark pixels, and increasing or decreasing the amount of peelings being removed to bring the number of dark pixels subsequently determined closely to said predetermined value of dark pixels.

2. The method of claim 1 wherein the gate is adjusted as to the degree to which it is opened to increase or decrease the amount of peelings being removed.

3. The method of claim 2 wherein if the gate adjustment step does not bring the dark pixels subsequently determined closely to the predetermined value of dark pixels, the speed of rotation of the rollers is adjusted.

4. The method of claim 1 wherein said photographs are taken two times per second.

5. The method of claim 1 wherein said photographs are taken of a group of products passing under the lighting structure in an area approximately 8.5 inches by 8.5 inches.

6. The method of claim 5 wherein the pixels in the entire photographs are determined.

7. The method of claim 1 wherein a plurality of photographs are used to calculate an average number of pixels per photograph to compare with said predetermined number of pixels.

8. The method of claim 1 wherein after each position change of said gate, pixels are not thereafter measured for a period of approximately two minutes.

9. A product peeling machine for controlling the removal of peeling from a potato product being passed into a hopper having a supply auger for discharge of the product into a peeling chamber having a plurality of parallel longitudinal abrasive rollers arranged in an arcuate juxtapositioned relation, with a rotatable discharge gate movable between open and closed positions, a movable conveyor downstream of said gate, and power means to operate said auger, said rollers, said gate, and said conveyor, comprising:

a shadow free lighting structure over said conveyor, a high speed camera over said conveyor to take photographs of groups of product moving under said lighting structure, means for measuring the number of dark pixels in said photographs and comparing the same with a predetermined number of desired dark pixels, and control means for adjusting the operation of the machine to increase or decrease the amount of peelings being removed to bring the number of dark pixels subsequently determined closely to said predetermined value of dark pixels.

10. The device of claim 9 wherein said discharge gate is rotatably mounted in a discharge opening of said chamber, said gate comprising, an arcuate edge portion intersecting a straight edge portion, an indented area in said gate which extends into the discharge opening in an inclined direction to receive products falling downwardly from said rollers.

11. The device of claim 10 including means for rotating said gate to a plurality of positions, with each position being such that products dropping from said rollers will be received by said indented area and will be inhibited from becoming lodged between any of said rollers.

12. A product peeling machine for controlling the removal of peeling from a potato product being passed into a hopper having a supply auger for discharge of the product into a peeling chamber having a plurality of parallel longitudinal abrasive rollers arranged in an arcuate juxtapositioned relation, with a rotatable discharge gate movable between open and closed positions, a movable conveyor downstream of said gate, and power means to operate said auger, said rollers, said gate, and said conveyor, wherein said discharge gate rotatably mounted in a discharge opening of said chamber, and said gate comprising an arcuate edge portion intersecting a straight edge portion, and an indented area in said gate which extends into the discharge opening in an inclined direction to receive products falling downwardly from said rollers.

13. The device of claim 12 including means for rotating said gate to a plurality of positions, with each position being such that products dropping from said rollers will be received by said indented area and will be inhibited from becoming lodged between any of said rollers.

* * * * *